US010606901B1

(12) United States Patent
Nair et al.

(10) Patent No.: US 10,606,901 B1
(45) Date of Patent: Mar. 31, 2020

(54) DATA DISPOSITION SERVICES ORCHESTRATED IN AN INFORMATION MANAGEMENT INFRASTRUCTURE

(75) Inventors: Manoj Nair, Cary, NC (US); Stephen R. Perrin, Chapel Hill, NC (US); Mark Weng Soon Wah, Cary, NC (US); John Philip Bell, II, Skibbereen (IE)

(73) Assignee: EMC CORPORATION, Hopkinton, MA (US)

( * ) Notice: Subject to any disclaimer, the term of this patent is extended or adjusted under 35 U.S.C. 154(b) by 366 days.

(21) Appl. No.: 11/864,778

(22) Filed: Sep. 28, 2007

(51) Int. Cl.
*G06F 17/00* (2019.01)
*G06F 16/906* (2019.01)
*G06F 16/907* (2019.01)
G06F 17/30 (2006.01)

(52) U.S. Cl.
CPC .......... *G06F 16/906* (2019.01); *G06F 16/907* (2019.01)

(58) Field of Classification Search
CPC combination set(s) only.
See application file for complete search history.

(56) References Cited

U.S. PATENT DOCUMENTS

| 5,787,247 | A * | 7/1998 | Norin et al. ................. 709/220 |
| 6,167,445 | A * | 12/2000 | Gai ..................... H04L 41/0893 709/220 |
| 7,076,805 | B2 * | 7/2006 | Bate et al. ........................ 726/31 |
| 7,571,069 | B1 * | 8/2009 | Farkas et al. ................. 702/120 |
| 7,680,830 | B1 * | 3/2010 | Ohr ..................... G06F 17/30085 707/999.2 |
| 7,730,172 | B1 * | 6/2010 | Lewis ..................... G06Q 10/04 709/223 |
| 7,895,220 | B2 * | 2/2011 | Evans et al. .................. 707/756 |
| 7,958,148 | B2 * | 6/2011 | Barnes ..................... G06F 21/10 707/783 |
| 7,970,743 | B1 * | 6/2011 | Kilday ............... G06Q 30/0603 707/689 |
| 8,055,622 | B1 * | 11/2011 | Botes .................... G06F 16/185 707/640 |
| 8,214,482 | B2 * | 7/2012 | Melvin ................. H04L 63/102 709/224 |

(Continued)

OTHER PUBLICATIONS

"Compliance Requirements Assessments IBM DB2 Records Manager and Record-Enabled Solutions", Oct. 2004, Cohasset Associates (Year: 2004).*

*Primary Examiner* — Polina G Peach
(74) *Attorney, Agent, or Firm* — Workman Nydegger

(57) ABSTRACT

Deleting objects in a computing system. Information management can be used to provide disposition services including the deletion of selected objects. The categorization process of information management can also be used to assign categories to objects such that an entity understands what the objects are. Understanding what the objects are may include the application of logic, including user-defined logic, to examine the objects. The results of the logic can then be used to assign categories to the objects. The policies of a user, which often define how objects should be treated are implemented by mapping the categories to the appropriate data disposition services. Once the specific disposition services, which include file deletion, are known, a workflow may be initiated to provide a period of review prior to physical deletion of the objects from the computing environment.

18 Claims, 4 Drawing Sheets

(56) References Cited

U.S. PATENT DOCUMENTS

| | | | | |
|---|---|---|---|---|
| 8,301,753 | B1* | 10/2012 | Melvin | H04L 61/103 709/224 |
| 8,539,496 | B1* | 9/2013 | Anand | G06F 15/177 709/223 |
| 8,577,852 | B2* | 11/2013 | Haagenson | G06Q 10/10 707/694 |
| 8,621,549 | B2* | 12/2013 | Lim | G06Q 10/10 726/1 |
| 8,635,247 | B1* | 1/2014 | Klinkner | H04L 47/70 707/783 |
| 8,862,752 | B2* | 10/2014 | Das | H04L 67/32 709/217 |
| 2002/0077999 | A1* | 6/2002 | Fergus | 707/1 |
| 2003/0011809 | A1* | 1/2003 | Suzuki | G06F 21/608 358/1.15 |
| 2003/0225801 | A1* | 12/2003 | Devarakonda | G06F 16/221 |
| 2004/0002942 | A1* | 1/2004 | Pudipeddi | G06F 16/10 |
| 2004/0098415 | A1* | 5/2004 | Bone et al. | 707/200 |
| 2005/0060684 | A1* | 3/2005 | Gupta et al. | 717/105 |
| 2005/0125768 | A1* | 6/2005 | Wong et al. | 717/100 |
| 2005/0132340 | A1* | 6/2005 | Houghton et al. | 717/136 |
| 2005/0171979 | A1* | 8/2005 | Stager | G06F 11/1466 |
| 2006/0004868 | A1* | 1/2006 | Claudatos et al. | 707/104.1 |
| 2006/0010150 | A1* | 1/2006 | Shaath | G06F 16/125 |
| 2006/0053263 | A1* | 3/2006 | Prahlad | G06F 3/0605 711/162 |
| 2006/0101084 | A1* | 5/2006 | Kishi | G06F 3/0608 |
| 2006/0106782 | A1* | 5/2006 | Blumenau et al. | 707/3 |
| 2006/0129415 | A1* | 6/2006 | Thukral et al. | 705/1 |
| 2006/0161590 | A1* | 7/2006 | Cahill | G06F 16/93 |
| 2006/0179033 | A1* | 8/2006 | Stanke et al. | 707/2 |
| 2006/0206507 | A1* | 9/2006 | Dahbour | 707/100 |
| 2007/0079379 | A1* | 4/2007 | Sprosts et al. | 726/24 |
| 2007/0130127 | A1* | 6/2007 | Passmore | G06F 21/10 |
| 2007/0130218 | A1* | 6/2007 | Blumenau | 707/201 |
| 2007/0130224 | A1* | 6/2007 | Fischer | G06F 16/217 |
| 2007/0150445 | A1* | 6/2007 | Debie | G06F 17/30522 |
| 2007/0180490 | A1* | 8/2007 | Renzi | G06F 21/577 726/1 |
| 2007/0271308 | A1* | 11/2007 | Bentley et al. | 707/200 |
| 2008/0282321 | A1* | 11/2008 | Hecht et al. | 726/1 |
| 2008/0294673 | A1* | 11/2008 | Rupp | G06F 17/30415 |
| 2008/0301190 | A1* | 12/2008 | Lockhart | G06Q 10/109 |

* cited by examiner

DATA DISPOSITION SERVICES ORCHESTRATED IN AN INFORMATION MANAGEMENT INFRASTRUCTURE

CROSS-REFERENCE TO RELATED APPLICATIONS

Not Applicable.

BACKGROUND OF THE INVENTION

1. The Field of the Invention

The present invention relates to information management. More particularly, embodiments of the invention relate to systems and methods for orchestrating the deletion of objects including files.

2. The Relevant Technology

The world is becoming more reliant on electronic-based data and many activities are being conducted electronically. Correspondence such as email and instant messages are becoming a predominant form of communication and the Internet is fast becoming one of the primary sources of information. In many different circumstances, electronic data is being generated in a wide variety of forms. The data often has different values to different persons or entities. Often, the value of the data may depend on the context in which the data is created or accessed. Some data may be relevant to a person, to an entity, or perhaps to both. For example, data created in an online transfer of funds may result in data that is important to both the individual and the financial institution. Other types of information may be interesting to an employee, but may not have any significance to the employer. For example, an employee may store media files that are of no value to the employer.

As people and entities become more centered and reliant on electronic data, the ability to manage the electronic data becomes crucial for a wide variety of different reasons. Much of the electronic data maintained by an entity or organization, for example, often relates to the business of the entity and is therefore subject to various considerations such as data security, data backup, data retention, data access control, regulatory compliance, corporate compliance, and the like or any combination thereof. The amount of an entity's data that receives these services has an impact, by way of example, on the cost of the services as well as on the computing resources of the entity.

One of the ways that an entity can control the impact of its data is to control the data. For example, an entity may be providing services to data that is of no use to the entity. This can increase the cost of the services being provided and consume computing resources that could be devoted to other more important data. In fact, an entity may often desire to simply delete data that is not of sufficient value. By controlling how the data is deleted, an entity can reduce costs and improve the management of its computing resources. Unfortunately, many entities are unable to effectively identify data that can be safely deleted.

There are several reasons for controlling how data is deleted. One of the most obvious reasons for deleting data is to conserve storage space. Many files do not contain information or data that is of any value to an entity can be safely deleted. For example, media files, such as mp3 files, videos and/or images that are downloaded by users (e.g., employees) are often not relevant to the operation or business of an entity. These types of files can be readily and safely deleted. In fact, keeping these types of files can increase the cost of data services, for example when they are stored on file servers that are regularly backed up.

There are other reasons, however, for deleting certain data. A file that contains sensitive information, for instance, may be stored in an insecure location, such as a server that is not secure. In this situation, there is a more urgent need to delete this type of data for various reasons. For example, these types of situations can compromise user privacy, subject an entity to liability, and the like. In another example, some files may simply be old enough to discard without concern or have outlived their usefulness.

At the same time, there are also may files that should not be deleted. These files may include data that is relevant to the entity, be subject to various regulations, etc. In conventional systems, however, it is difficult to accurately identify the data that should be targeted for deletion. Procedures that rely on the owners to delete their own data often fail because the owners do not take the time or do not have the time to review which files should be deleted. As a result, data continues to accumulate and incur cost unnecessarily. There is therefore a need to provide and orchestrate the deletion of data.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings.

DETAILED DESCRIPTION OF THE INVENTION

Figure 1:
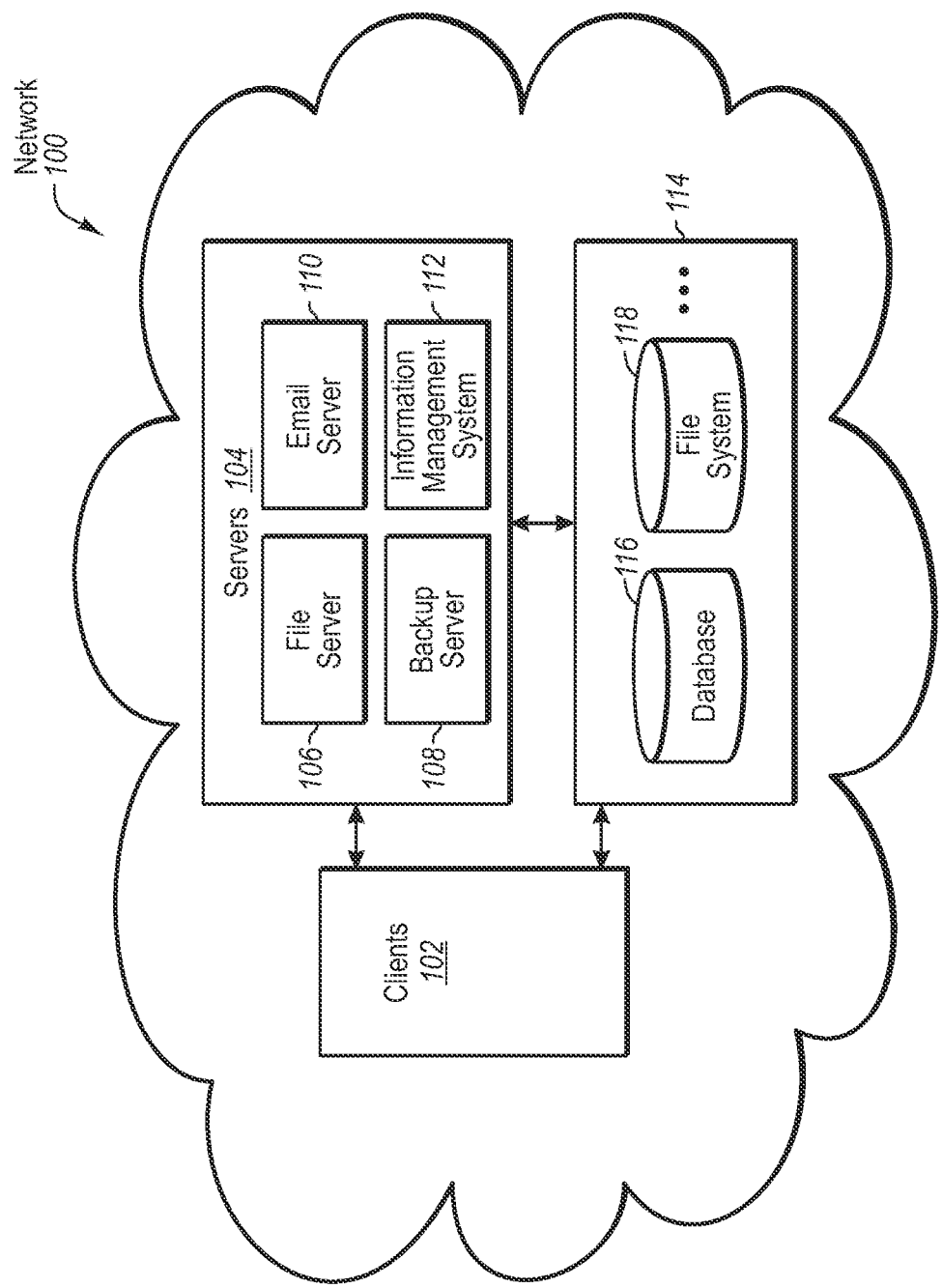
FIG. 1 illustrates an exemplary environment for implementing embodiments of the invention.

Embodiments of the invention relate to information management. Information management enables the orchestration of services such as data protection, data placement, corporate compliance, deletion services, and others based on the value of the underlying data. Embodiments of the invention enable the data to be classified in an automated fashion and provides various levels of granularity that can be adjusted as needed. Further, information management in accordance with the present invention enables services to be provided to data regardless of where or how the data is stored. Embodiments of the invention further enable the orchestration of data deletion in multiple environments.

Information management is scalable and can be implemented in a variety of different computer or computing systems. A computer system, by way of example only, may refer to a single computer, to multiple computers (including clients and/or server computers, and other devices) that are connected with a network. The objects of a computer system can include servers, applications, services, data, files, and the like or any combination thereof.

I. Introduction to Information Management

In one embodiment of the invention, the orchestration of data deletion occurs in the context of information management. The deletion of objects (such as data or files) from a computer system often relies on an understanding of the computer system, including the hardware, software, network configuration, services, and the like or any combination thereof. The following description describes information management in a computing system describes the orchestration of effective deletion services.

Implementing information management including the orchestration of deletion services in accordance with the present invention requires an understanding of the computer system or of servers operating on the computer system, services operating on the computer system, and of the data (files, information, emails, etc.) that exists in or is accessible by clients, servers, and services on the computer system. This knowledge can be obtained through discovery of the computer system, which provides the information management system with an understanding of the relationships that may exist between the various servers (and other devices) on the computer system and the data that is accessible over the computer system. The discovery of a computer system provides the information management system with information that can be used to classify the computer system and the data in the computer system.

After the computer system (infrastructure and data) has been discovered, it is useful to classify the data that is in the computer system. Classification is a process that enables each object to be grouped with other objects or be examined in a manner that enables the needed services for that object to be identified. For example, all objects that need a particular service may be grouped. Alternatively, embodiments of the invention enable each object to be categorized and classified individually. As a result, the service needs of each object can be considered. Thus, the groupings identified herein are distinct from coarse groupings that fail to consider the service needs of the objects individually.

An object can be any data (e.g., file), server, service, application or the like in the network. Classification typically assigns each object to one or more categories. If available, information management enables each object to receive the services that each object requires. More common, services are typically provided in packages. As a result, the service level objects as identified by the assigned categories are often matched to the best available service package. Embodiments of the invention, however, are not so limited.

Once classification is complete, service level management is performed using the assigned categories. Service level management provides methods for modeling/mapping the results of discovery and classification to service levels. After service levels have been identified, the various services can be orchestrated and executed. Advantageously, the services can be carried out with respect to individual objects rather than on shares or drives. As a result, an entity may only pay for the services that are actually needed rather that pay for services that may not be needed. Further, unstructured data is categorized and can be provided with the services based on its value to the entity. In one embodiment, classification is a way for an entity to automatically place a value on the various objects of data.

Information management is also a process that can be ongoing. In most computer systems, objects are continually added and those objects typically require certain services. In addition to new objects, many objects also have a lifecycle associated with them. As a result, the status or need for services for certain objects can change over time. Information management incorporates lifecycle aspects such that data that grows old or stale can have the various services changed as needed.

Also, embodiments of the invention include reports, auditing, gap analysis, and the like to ensure that the services being provided are adequate. This protective ability ensures, for example, that a company complies with any applicable rule or regulation. The detection of a gap in service, for example, can lead to a change in service levels.

II. Exemplary Environment of a Computer System

FIG. 1 illustrates an exemplary environment for implementing embodiments of the invention. FIG. 1 is intended to illustrate that, while many systems often have similar functions, the actual implementation from one network to the next can vary significantly. The variability in network configurations is one of the aspects that have hindered conventional attempts at information management. The variability may be related, for example, to the type of software installed, the hardware selected for the network, the configuration of the hardware/software and the like. As previously described, this is one of the reasons that discovery of a computer system is not limited to the objects in the computer system but also includes discovery of the servers and services that are operating in the computer system. An understanding of the hardware, software, servers, applications, and services in a computer system can improve the ease and accuracy with which objects are classified.

In this example, the system 100 includes a network such as a local area network, a wide area network, and the like or any combination thereof. The connections in the system 100 can be wired and/or wireless. In this case, the computer system 100 typically includes clients 102 that have access to various servers 104 and to data 114. Various services and/or applications are typically provide by the servers 104 and, in some embodiments, access to some or all of the data 114 is controlled by the various servers 104. Some of the data 114 (e.g., backed up data) is not necessarily available to the clients 102.

Examples of the servers 104 may include a file server 106, an email server 110, a backup server 108, and an information management server 112 and the like or any combination thereof. Each of the servers 104 resides in or is accessible over the computer system 100. The data 114 may include file storage 118, a database 116, and the like. The file storage 118 and database can be implemented in various ways using different software, different configurations, and the like. The hardware used to store the data 114 can include network attached storage (NAS) systems, and any other system known to one of skill in the art.

The data 114 can also be partitioned in different ways as well for different lines of business within the entity. For example, the data 114 may include a share for home directories, a shared area, an engineering share, and a marketing and sales share. Each share may be in its own domain to allow fine grain management by the respective line of business. One advantage of having different shares is that the corresponding files can be owned by different users.

One of skill in the art can appreciate that the clients 102, servers 104, and data 114 can be connected in a wide variety of configurations using various types of connections. Further, the software that operates on the servers 104, clients 102, and on the data 114 in some instances, may have certain properties or configurations. As previously discussed, it is this variability that can often complicate the ability to manage the information in a network.

Further, the clients 102 and the servers 104 can store data in a wide variety of locations. Data can be stored locally, on network storage, and the like. The ability to keep track of this data and identify when the data can become a complex issue because of the variability in how computing resources are used in any given system. The information management stored herein can treat objects individually, regardless of location. This enables the objects to be classified individually and, as a result, specific objects can be selected for deletion during the normal operation of information management.

III. Information Management in a Networked Environment

Information management according to embodiments of the invention has several components that work together to provide an understanding of the value of an entity's information. In some instances, the entity itself can provide or define some of the logic or rules that is used to classify or categorize the objects. Embodiments of the invention enable an entity to control some or all of the logic used for classification. Advantageously, this illustrates one way that embodiments of the invention enable an entity to better value its data. Objects can be classified or categorized individually using the entity's own logic and/or used other automated categorizations. As a result, the service levels ultimately identified for that data reflect the entity's perception of the object's worth. Using similar processes, information management can identify data for deletion and then orchestrate the deletion of the identified data.

For example, an entity may want to retain objects that were authored by a particular person for a long time. A rule to that effect that is processed for the objects of the entity can then help classify the objects in an automated manner and the entity is assured that all objects that satisfy the requirement are receiving the appropriate services.

More generally, an information management system can examine all business objectives for files simultaneously, not just one at a time. For example, some of the files authored by a particular person may contain personal data on employees who have left the entity. Such files often fall under laws that require their destruction after a certain time period. Thus, some of the files authored by the person may need to be retained for a shorter length of time due to a more pressing consideration (regulations). One embodiment of information management can thus consider both the desire to retain files written by the author and consider regulations at the same time, for each object. Embodiments of information management can recognize conflicting service goals, as in this example, and then resolve the conflict. At the same time, some of the business objects may be additive. For instance, the entity may also desire to index all files written by the specific person. The service level selected for these types of files reflect the need to both index and retain.

Information management also reduces various risks (such as corporate and/or regulatory non-compliance) often associated with unstructured data. As described below, embodiments of the invention provide a system for classifying data such that the appropriate services can be provided to the entity's data or to other data stored using the entity's computing resources. Embodiments of the invention also enables services that are required by an entity to be effectively identified and orchestrated. Examples of the services often required by entities includes backup services, retention services, corporate compliance services, regulatory compliance, data accessibility, data deletion, and the like or any combination thereof.

A. Discovery in Information Management

Figure 2:
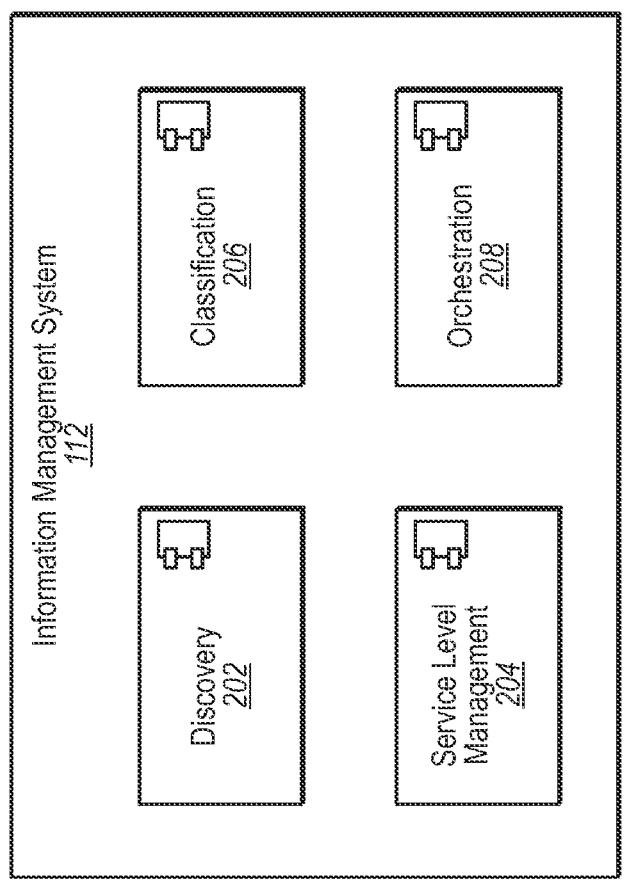
FIG. 2 illustrates one embodiment of a system and/or method for providing information management.

FIG. 2 is a flow diagram illustrating an exemplary system and method for information management of data including unstructured data files or objects. FIG. 2 provides an overview of information management, which is discussed in more detail with respect to FIGS. 3-5. Further, FIG. 2 illustrates that the various aspects of information management can be performed in various orders or independently. For instance, classification 206 can be performed at any time. All aspects of information management are typically performed at the when a computing system is initially examined. After that, however, discovery of the network (hardware) is performed much less often as it experiences fewer changes. Other aspects of information management (discovery of data, classification or reclassification of objects, etc.) may be performed more often because the data of an entity continually changes.

Discovery 202 is often the first element of information management. According to embodiments of the invention, discovery 202 includes both a discovery of the infrastructure and of the objects (data, files, etc.) in the network.

The discovery of the infrastructure, for example, can include a discovery of all IP devices on the computer system 100 that appear to act as a server. In to discovering these servers, discovery 202 may include discovering services as well. Thus, discovery 202 includes discovering the servers, services, and data residing in a network. Information management can also discover devices, servers, and/or applications that offer services, what kinds of service each offers, and what levels of service or capabilities are supported by that service provider.

The discovery of a computer system can be done in a variety of ways. The discovery of the infrastructure, for example, may involve an examination or analysis of all IP addresses existing in a network. Devices that act as a server can thus be identified. Once these servers are identified, additional information can then be sought from those servers. Applications can also be identified. For example, many entities often have a payroll application that includes a software program working in conjunction with a database. The database can be examined and may have certain table or logs when acting, for example, as source for payroll. The traffic on the network can also be decoded to examine headers to extract information that can characterize the network for the information management server. In this manner, the applications can be discovered. The discovery of an application can be used as additional input when categorizing the objects or data used by the payroll (or any other) application. For example, certain data or objects used by a payroll application may require special service levels that are not needed by other data or objects.

B. Classification in Information Management

Classification 206 is typically the next step in information management. Classification 206 is the process of collecting information about the data and/or of the infrastructure of a network and then identifying or associating the data or objects with categories. One result of classification is to associate objects being classified with certain categories. More particularly, the information collected during discovery 202 can be used during classification 206. The resulting categories assigned to objects in the computer system can be used in subsequent parts of information management as described below.

Classification 206, however, is not limited to the information collected during discovery. Classification 206 can also include, for example, applying sets of rules to the objects in a network. The rules can be default rules or rules that are selected according to a line of business of the entity or for any other reason. For example, objects that includes social security numbers may have to be retained for some period of time per governmental regulations. Alternatively, objects whose owner is a member of marketing may only be retained for a few years, but require full indexing.

In addition to applying rules to the objects of the entity, classification 206 also includes the generation of metadata as well as the use of existing metadata. Generated metadata includes values that are derived from an information objects rather than having been collected by the environment. For example, hash values can be generated and then used to identify duplicate objects. Another example of generated metadata is the case where the objects are examined for specified keywords and/or patterns. This generated metadata, or metadata derived from an object being analyzed, are useful during the classification process.

Existing metadata, on the other hand, can be collected from the objects or from the environment. For example, the owner, size, share, etc., of an object can be collected and used to automatically categorize an object. The collected metadata (such as file owner) can be used by rules to categorize the content of the object and/or the object itself. In some embodiments, a particular object may be associated with more than one category.

In another embodiment, aging considerations can be a consideration when classifying an object. On the other hand, aging considerations can be a component of service level mapping as discussed below. The aging characteristics or other lifecycle information of a particular object may also be used during the classification process. For example, an annual report is always an annual report. However, newer annual reports may require different services than older annual reports. This aging or lifecycle consideration can be part of classification and/or it can be considered during service level mapping.

C. Service Level Management in Information Management

After the objects have been categorized during classification 206, service level objectives can then be identified for the various objects. A category can be mapped through configuration data to one or more service level objectives. A category can also be mapped to a lifecycle, each of whose stages may have different service level objectives. There may be several categories involved in the analysis of a single information object, resulting in a variety of service level objectives or possibly conflicting service level objectives. Information management can also resolve conflicts, for example, using user supplied logic or by default.

In other words, the classification process has already assigned categories to each of the objects. During the classification process, some of the various categories are assigned to each object as applicable. These categories can then be used to identify the service level objectives that may apply to the various objects. The discovery, for example, may have identified a particular object as an annual report and the classification of the annual report assigned a category of business critical. The information management system may be configured to map annual reports to lifecycle L1. If the object in question has aged enough to be in the second stage of that lifecycle, then a service level objective for that stage may dictate that the file needs to be retained for a specific period of time. Alternatively, the classification of the object may also indicate that the object should be retained for some specified period of time.

In this manner, the object that has been classified is then processed (using the assigned categories and/or lifecycle information) to identify the various service level objectives that should apply to the object. The service level objectives can then be bundled together into a target bundle that collectively represents the service level objectives that are desired for the object. Next, service level mapping includes matching the target bundle of services with service packages that are actually provided from service providers. If the service level objectives do not match or are not satisfied by the best matching actual service package, then a service gap is present.

The use of packages is often used by some entities that manage some or all of their services by restricting the offerings to a number of supported combinations of service levels. In other words, the particular combination of service level objects may not represent a supported package (also referred to herein as a service bundle). Embodiments of the invention contemplate logic that is used to find a suitable service package that is close enough to what the object needs. The information management system may be able to report that no existing service bundle or service package was sufficient.

In the context of deletion, the files selected for deletion can be excluded from the various services at the time the files are selected for deletion. Further, a decision can be made to archive the selected files prior to deletion. The decision can depend on the value of the files to the entity. In some instances, an entity may want a file archived, but not present in active storage. Alternatively, the entity may want the file deleted. As used herein, deletion includes simply removing references to the files or actual destruction of the file by writing over the selected files.

D. Service Orchestration in Information Management

In information management, orchestration is the process by which the services are orchestrated. Orchestration can automate multiple service actions and translate and end user service level request to provider action. The workflow needed to execute the services are coordinated during orchestration. An example of a workflow for deletion services is illustrated and described below.

III. Information Management and Data Disposition Services

Embodiments of the invention relate to the disposition of data, which may include the deletion of data. Information management can classify data or assign categories to data in order to implement policies. In other words, information management can classify data using categories to drive policy resolution. It is typically the policies that are used to determine whether or not a particular file is deleted. For example, categories such as "files not accessed for six months" or "media files" can be created and rules can be implemented to classify objects. For example, an mp3 file may be assigned the category of media file.

Other categories such as "contains sensitive information" can also be created with the goal of resolving policies. In this case, the content of files can be examined to determine if they contain sensitive information. The scope of the category can be refined by the rules that are used to classify the files. For instance, rules that find content that discuses mergers, or assets, or unreleased products, and the like can be classified under this category. One of skill in the art can appreciate that the categories can be refined in various ways, including by line of business, owner, or any other criteria. For example, files that are sensitive to the engineering aspects of a business may differ from the files that human resources deems as containing sensitive information. The rules can accommodate these types of decisions and properly classify an entity's files.

Information management accomplishes much more that simply identifying files for deletion. Information management can use categories to reflect more what data is compared to how the data is treated. Information management thus enables an entity to gain a better understanding of why a particular file is receiving a particular treatment. In contrast, conventional systems may simply identify a file for deletion. Conventional systems are unable to provide an understanding of why a particular file is to be treated in a certain manner.

Information management therefore uses categories, which are designed to reflect what the file is and what the file contains, to drive policy resolution. Information management advantageously enables an entity to implement its policies with an understanding of how those policies are applied to its data and to its computing environment. For example, the category of media files can be used to drive a policy of conserving storage space. Media files are large files that not only consume significant storage, but may also incur cost as they are backed up or receive other services. This category enables an entity to dispose of media files to implement this policy. The rules used to classify media files may include identifying mp3 files in a storage space.

In another example, media files may be relevant to the business of a company. For example, an online music store may have many mp3 files. In this case, the files may still be categorized as media files, but the treatment of those files is different. An online music store may desire to backup these media files as they constitute as asset. These examples illustrate that the categories of an information management system can be used to drive policies that determine how the data is treated. Any given category or group of categories could drive decisions or be used to implement policies related to retention, backup, encryption, deletion, and the like.

Figure 3:
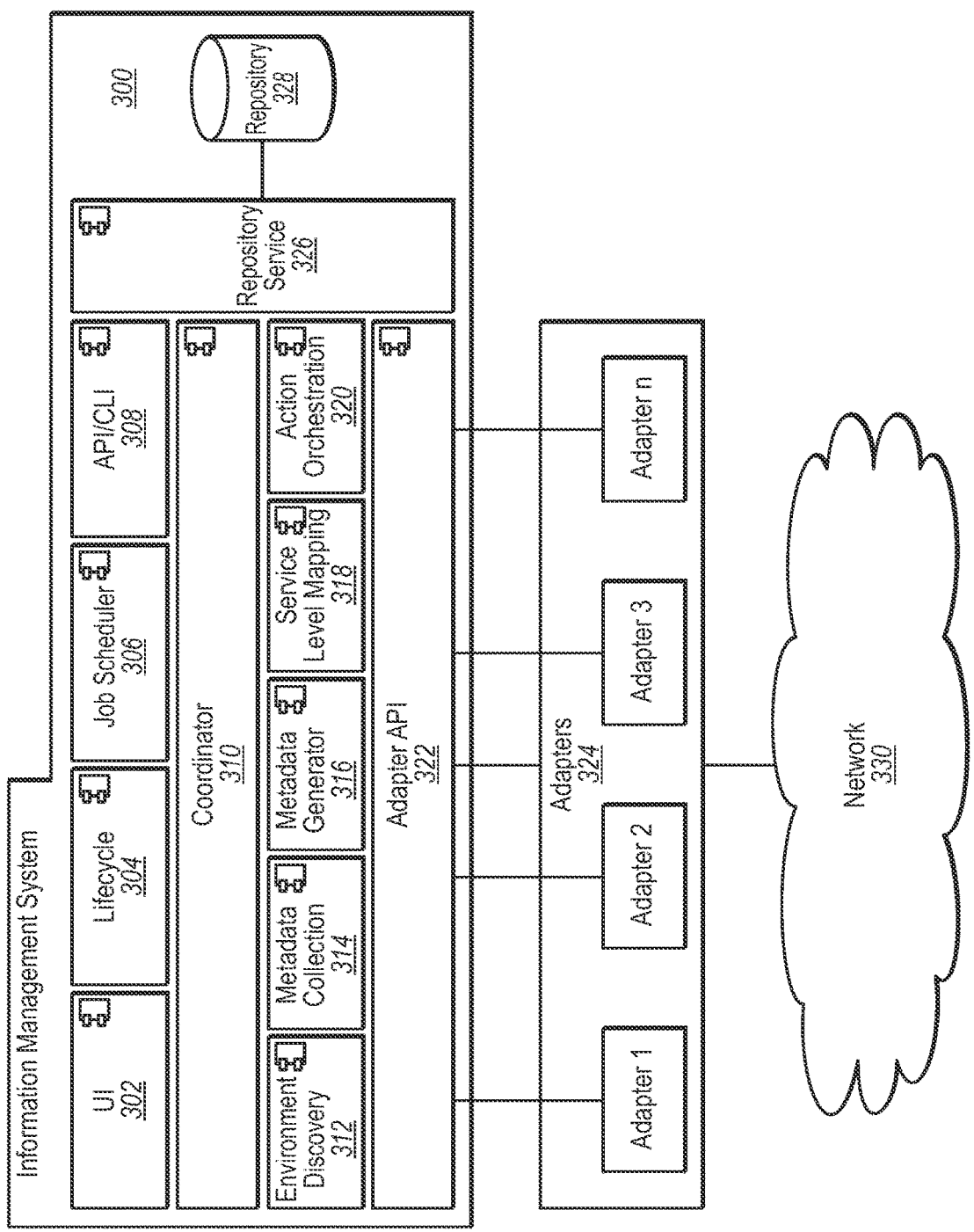
FIG. 3 illustrates an exemplary architecture for information management in a network environment.

FIG. 3 illustrates one embodiment of an architecture for information management. This embodiment of information management uses adapters to interface with a computer system. By using adapters, the information management system 300 provides scalability and adaptability as the computer system configuration changes over time.

In this example, the system 300 includes an adapter API 322 that interfaces with a plurality of adapters 324. The adapters 324 are used by the information management system 300 to interface with network. Information management 300 uses adapters 324 to discover the infrastructure of the network, to discover the objects (data, files, information, etc.) of the network, for classification of the data, and/or for action orchestration.

The adapters 324 can each be specifically prepared to enable the information management system 300 to interface and interact with various aspects of the network. For example, one adapter may enable the system 300 to discover IP devices on the network that are acting like servers. Another adapter may enable the system 300 to discover more information about specific types of network attached storage (NAS). Another adapter may enable the system 300 to examine or watch the network in order to discover applications. Adapters 324 can be used in metadata generation, by service orchestration to talk with various components about provided servers. Adapters 324 may also be used to deliver the services.

For example, if a particular NAS has its own adapter, that adapter can typically collect more information than what can be collected by a generic adapter. The specific adapter can take advantage of features in the NAS that are not necessarily available to other adapters. As more information is discovered or collected, the information management 300 can perform better classification, enable the data to be better evaluated, and assign more appropriate service level objectives. One of skill in the art can appreciate that many different adapters are possible. The adapters 324 can be used by each aspect of the system 300.

The system 300 includes an adapter manager 322 that provides an interface between the adapters 324 and the system 300. The adapter manager 322 can abstract the interface between the system 300 and the adapters 324 such that adapters can easily be accommodated by the system 300.

The discovery portion 312 of the system 300 uses the adapters 324 to discover the infrastructure and the other objects of the network 330. The discovery portion 312, for example, may use a particular adapter to discover information about a backup server. The discovery portion 312 may also use other adapters to discover the same backup server or to discover objects related to that back up server or within or used by that same backup server. All of the information collected through the adapters 324 can be combined or correlated.

After discovery (or during in some instances), classification is performed. In this embodiment, classification includes metadata collection 314 and metadata generation 316. The metadata collection 314 portion begins to collect metadata about the infrastructure and the objects. This can be performed, for example, by queries through the various adapters 324. Examples of metadata include size, owner, path, line of business, creation date, or any other information that can be collected using an adapter or information that may be provided about the data or device.

Metadata can also be generated during metadata generation 316. For example, metadata generation may use adapters to generate hash files, look for patterns or key works in objects, and the like. If key words or patterns are found, they can be included in the generated metadata. From a deletion perspective, it may be more efficient to evaluate the metadata rather than consume resources evaluating the content of the file. Thus, a file can be selected for deletion based on the metadata and/or the generated metadata. Advantageously, the discovery process and the content analysis process may generate metadata that may be used during the assignment of categories, which are then used to make an entity more aware of what the data contain when making decisions about how to treat the data.

The generated metadata can be used to classify the data. In this example, the discovery of an object can cascade as additional information is discovered. For example, metadata generation often begins by looking at the metadata of an object to see if the object is worth further processing. Binary files, for example, may not include any data that is useful in the context of later rules. Thus, the rules may be ignored for certain objects. Next, hash rules may be applied, for example to look for duplicate objects. Metadata generation may also use computer information service rules to look for certain key words, patterns, etc., in an object. Classifier rules can also be used during this process. For example, classifier rules tell how to assign categories to an object (an object with a social security number is categorized as a HIPPA file). Once generated, the assigned categories are another example of metadata. Often, the logic or rules used to classify or categorize an object are defined by the entity. Alternatively, the logic or rules of an entity can augment standard categorization rules. Finally, category assignment rules are executed that assign the data or objects to one or more categories.

As discussed herein, information management also relates to the disposition of data, which may include the selection or identification of files or other data that can be deleted. An entity may have many motivations to delete data, including to recover space, to protect sensitive information, corporate compliance, resource management, data archiving, and the like or any combination thereof. An entity's desire to implement data disposition often relies on an understanding of what the data includes or represents. As previously stated, simply identifying a list of files to be deleted does not convey an understanding of the content of those files.

For example, user specific files that are unrelated to an entity's business may be identified for deletion on a regular basis. This can be achieved, in one embodiment, by creating categories that reflect what a file is or what it contains. In another example, corporate policies may dictate that userfiles be deleted when they reach a certain age. If a file has not been accessed or used for some period of time, this policy can be implemented as the assigned categories are mapped to the appropriate data disposition service, which may to file deletion. As discussed previously, once categories are assigned to data, the categories can be mapped to services automatically. In this manner, the policies of an entity can be accomplished with an understanding of why a particular file is receiving a particular service or treatment.

The metadata, the generated metadata, the classifier rules or any combination thereof can result in the assignment of a given object or file to a category that provides an understanding of the content of the data or other aspect of the data. Often, the assignment of a certain category may supersede any other categorizations assigned to the same file. This hierarchy of categories is often accounted from as the data is mapped to services. At the same time, information management does not neglect the importance of categories that has a lower category or value.

Once the categories have been assigned to the various objects (e.g., data or files), the coordinator 310 can then initiate service level mapping 318 as mentioned above. Service level mapping includes identifying service level objectives from the assigned categories of the objects. The desired services for the objects are then mapped to services that are actually available. For example, a service provider that offers backup, retention, and other services often offers service packages, but does not typically offer packages that specifically cover every potential need or variation of service. As a result, service level mapping is the process of identifying the best fit based on the service level objectives of an object and the offered service packages. One of skill in the art can appreciate that embodiments of the invention could identify the exact services required for each object, but may be limited by the services that are actually available. As a result, service level mapping includes the process of mapping the services level objectives to available services from the service providers. This process may also identify gaps in service. For example, none of the service packages available satisfy the service level requirements of an object, resulting in a service gap.

Next, the coordinator 310 initiates action orchestration 320. Action orchestration 320 is the process by which the selected services in the service levels can be delivered. In one example, the action orchestration submits a proposal to orchestration adapters. The adapters report their ability to satisfy the proposal of the action orchestration 320 at specified locations. The action orchestration 320 then selects the best location and adapter set to satisfy the service requirements of the data. The actions are then performed.

In another embodiment, action orchestration 320 is not performed or is postponed. It is useful to identify what information management can achieve in a given computer system before actually performing or orchestrating the services. Thus, reports can be generated to provide a preview of what will be orchestrated.

The information management system includes a repository service 326 that has access to a database 326. In one embodiment, the database 328 is used to store infoobjects, which are objects used to record the processing state of data in the network and to record specific information. The infoobject can be persisted for state information and can support dynamic properties. For example, as new objects are discovered or additional classification information is found or accumulated, this information can be recorded and stored in the infoobject. For example, an infoobject may include the categories assigned for data particular object. These categories, as described above, can then be used for service level mapping.

As noted earlier, FIG. 3 provides an illustration of information management. However, there are some aspects of information management that may not be performed repeatedly. The discovery of the infrastructure, for example, happens less frequently because the environment changes less frequently. More frequently, objects such as files, emails, and other data may change more frequently. Files are created, modified, aged, and the like. As a result, the metadata of these objects can be reviewed regularly and the categories can be reevaluated over time. This enables an information management to adapt the services received by the objects of the computer environment as the objects change.

When deleting files or other objects from a computing system, deletion can be performed in the context of information management as a service or it can take advantage of the information produced by information management. For example, the generated metadata can identify keywords or phrases, or other aspects of a file that may be the basis for deletion. Often, the metadata is combined with other aspects of information management (such as associated file server) when selecting objects for deletion.

The deletion of objects (including data and files) uses information management to achieve successful deletion. For example, a category may be created that is called "sensitive information on an insecure server". Information management can assign this category to an object when it determines that a server is insecure (e.g., from discovery of the environment) and that the object contains sensitive data (e.g., content may include a social security number). This categorization is then mapped to a service level objective and ultimately to a data disposition service. The categorization enables the entity to identify files that have sensitive information and are improperly stored. The selected data disposition service, therefore, may transfer the object to a secure server and delete the object from the insecure server.

Often, aspects of information management may use designated characteristics when categorizing a file. In one example, deletion indicators may be used to categorize an object. Deletion indicators are examples of rules that may be used during the assignment of categories. Often, the rules are compound and may include by way of example only, the location of the file, the author of the file, keywords, phrases, words, aspects of the metadata, and the like or any combination thereof. For example, a rule may be created to identify data such as emails and files that are related to a particular project. In this case, the entity may have a policy of purging data that relates to certain types of projects. Information management can process the objects to identify files and emails that satisfy the rule. These objects are then assigned a particular category. The implementation of the entity's policy can then be achieved by mapping that category to the proper data disposition service. In due course, the data disposition service is orchestrated and the identified files are deleted. As previously stated, this can be achieved automatically. Advantageously, the entity can understand what is being deleted and why a particular data disposition service is selected.

Figure 4:
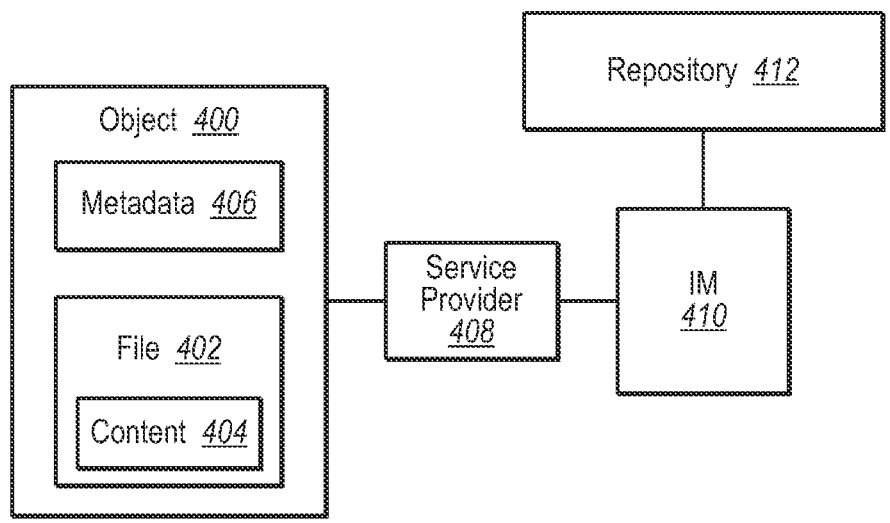
FIG. 4 illustrates one example of an object that is selected for deletion.

FIG. 4 illustrates an example of object deletion in a computing environment. The information management (IM) system 410 drives the information management process and often uses service providers 408. The service providers 408 can be an integral part of IM 410, or can interface with IM 410 using adapters. The adapters, when provided or if necessary, provide the logic allowing the service providers 408 to interact with the IM 410. In this example, the service provider 408 may include a service disposition provider that is responsible for the disposition, as described herein, of the object 400.

FIG. 4 illustrates an object 400, which includes a file 402 in this example. The file 402 typically includes content 404 and is associated with metadata 406. The information management system 410 can discover the object 400 as previously described. As part of the discovery process, the information management system 410 may identify the server on which the object 400 is stored. Any discovered information about the object 400 may be stored in a repository 412. Part of the discovery process may also generate metadata, for example identify phrases, words, etc., present in the file, create a hash of the file, and the like.

Embodiments of the invention do not require all types of discovery to occur prior to data disposition. For example, the file may have been previously categorized. In this case, the information management system 410 may review the current categorizations, metadata, etc., and determine that the categories of the object 400 are the same or determine that new categories should be assigned. In either case, the policies of the entity can be achieved as these categories are mapped to service level objectives and data disposition services.

As part of the categorization, the content 404 may be reviewed using deletion indicators. As previously noted, certain deletion indicators may cause the object 400 to receive certain categorizations. In some instances, more than one deletion indicator may be used to assign a particular category to the object 400. The identification of deletion indicators or implementation of processes to detect deletion indicators can be embodied as rules, policies, database entries, customer logic, pre-defined rules, and the like or any combination thereof. In one example, the generation of metadata includes the identification of deletion indicators. Thus the discovery and classification of objects may include deletion indicators that are used in assigning categories to the objects.

More particularly, the categorization of the object 400 can examine the content 404 for phrases, keywords, and the like that indicate the file should assigned to a particular category. The metadata can also be examined to during the process of assigning categories to objects. For example, the length of time since the object was last accessed, the author, the size, the file type, and the like are examples of metadata that may be used to assign a category to an application.

Other aspects of information management may also be used to select files for deletion. The point of a file in its lifecycle, for example, may be used. A file that is in its last stage of its lifecycle, for example, may be deleted. More specifically, files in this stage of its lifecycle are assigned to an appropriate category. Depending on the policies of the entity, this category may be mapped to a data disposition service that includes deletion of the files in that category. At the same time, the same data disposition service may also ensure that the associated data is archived before being deleted.

The advantages of the invention enable information management to use the discovery of the environment and of the objects themselves as well as a powerful categorization process to identify appropriate data disposition services. Advantageously, information management is able to examine each object independently rather than in a group, which increases the quality and effectiveness in disposing or providing other services to objects. When data disposition includes deletion, deleting files can converse space, conserve computing resources, and reduce service requirements, which lowers cost to the customer.

Figure 5:
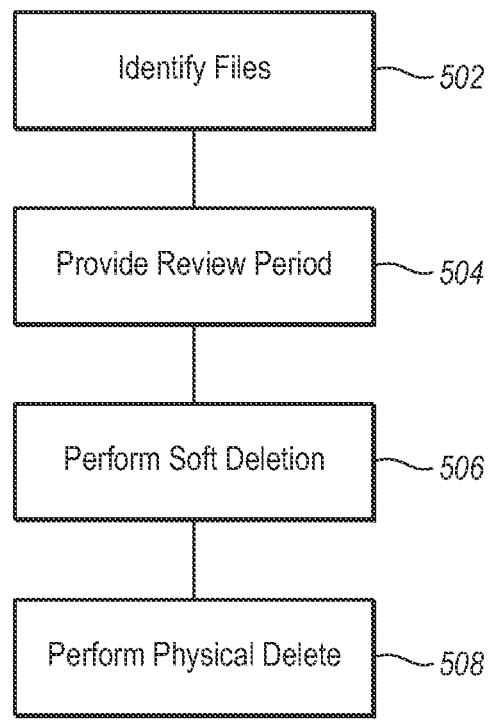
FIG. 5 illustrates one embodiment of a workflow process for orchestrating deletion services in information management.

FIG. 5 illustrates one embodiment of a workflow for providing data disposition services to objects such as files in a computing system that uses information management. The method typically begins by identifying 502 objects that satisfy certain rules or other criteria that can be used to assign categories that indicate what a file is as well as what it may contain. The process of identifying objects in this manner often involves a categorization of the file. This can include, by way of example only, searching the content of the file to identify words, phrases, sensitive data, and the like. Categorization or the assignment of categories may also include applying entity configured rules to the file. Metadata (which typically includes the metadata that is collected from an object as well as the metadata that is generated from the object) can be examined and analyzed as well. In some example, logic is applied to the metadata. Additional metadata can be generated and examined to determine if the file is a candidate for a particular category as discussed herein. In another example, the metadata may already include deletion indicators, which can be used in assigning the objects to various categories.

After files have been processed in this manner, the appropriate data disposition services are selected based on the assigned categories and a period of review may be provided and performed 504. This can entail sending notifications to persons or entities that may have accessed the file previously, to the owner of the file, and the like, to provide notice that the file has been selected for a particular service. This gives these entities and persons an opportunity to object or otherwise prevent the implementation of the service, which may include deletion. This may lead to a more detailed review of the file.

Once the period of review expires and when the service includes deletion, the object or file may be soft-deleted 506. In one example, the access control list (ACL) for the object is changed such that access is limited. In another example, soft-deletion of an object may include setting the corresponding "hidden" bit such that the object is hidden, at least to casual users. This is another way to provide an additional period of review because the file is now inaccessible except as provided in the new ACL. Finally, the file is physically deleted 508 from the computing system. In some instances, the file may still be available in an existing backup or in another retention archive. However, it has been deleted from the active files. Whether the file has been backed up or otherwise retained may depend on how the file was categorized. For example, a file with a social security number may be deleted but still retained in an archive as mandated by regulations. In contrast, a music file may simply be deleted and not preserved in any manner.

The embodiments described herein may include the use of a special purpose or general-purpose computer including various computer hardware or software modules, as discussed in greater detail below.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

Additional features and advantages of the embodiments disclosed herein will be obvious from the description, or may be learned by the practice of the invention. The features and advantages of the embodiments disclosed herein may be realized and obtained by means of the instruments and combinations particularly pointed out in the appended claims. These and other features of the embodiments disclosed herein will become more fully apparent from the following description and appended claims, or may be learned by the practice of the embodiments disclosed herein as set forth hereinafter.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A method for performing information management for data objects in a computing system using information management, the method comprising:

collecting, using a first adapter, first metadata concerning data objects stored in the computing system, wherein the first metadata already exists with the data objects prior to collecting the first metadata;

examining network traffic in the computing system to identify network traffic information that identifies applications operating in the computing system, wherein the network traffic information is included in the first metadata;

generating, using a second adapter, second metadata based on the data objects, wherein the second metadata is different from the first metadata and is derived from the data objects and at least a portion of the first metadata, wherein deriving the second metadata includes performing cascaded discovery for at least some of the data objects such that a portion of the first metadata is used to generate at least some of the second metadata and wherein at least a portion of the second metadata is derived from content of the data objects;

classifying the data objects in the computing system to assign one or more categories to each data object, wherein each data object is classified individually using the first metadata and the second metadata, and wherein classifying data objects includes applying rules to assign one or more categories to each of the data objects, wherein results of the rules, the first metadata and the second metadata are used to assign the one or more categories to each data object are stored in a repository separate from the data objects, wherein the first metadata, the second metadata and the rules are configured to apprise an owner of the data objects about content of the data objects;

determining service level objectives for each of the data objects individually by mapping the categories of the data objects to the service level objectives based on the assigned categories, wherein each data object is associated with its own service level objectives;

mapping the service level objectives to services that are actually available in the computing system, wherein the services that are actually available include data disposition services, wherein the data disposition services are determined for each of the data objects individually;

orchestrating the services including the data disposition services by submitting a proposal to orchestration adapters and selecting selected orchestration adapters from the orchestration adapters that are best suited to provide the services based on responses of the orchestration adapters;

performing the data disposition services, orchestrated by the selected orchestration adapter for the disposition services, to the data objects that are associated with the data disposition service; and excluding data objects subject to the data disposition service from receiving other services until the data disposition service is performed, wherein providing the data disposition services includes:
  for first data objects that associated with a category indicating that the first data objects contain sensitive information and are stored on an insecure server, moving the first data objects to a secure server and deleting the first data objects from the insecure server;
  for second data objects associated with a category indicating that the second data objects require archiving, archiving the second objects and then deleting the second data objects;
  for third data objects associated with a category indicating that notification is required, notifying the owner of the third data objects that the third data objects are to be deleted prior to deleting the third data objects, wherein the notification provides the owner with a review period to determine whether the third data objects should be deleted;
  for fourth data objects associated with a category indicating that a review period is required, soft-deleting the fourth data objects by setting a bit such that the fourth data objects are hidden from at least some users, wherein the fourth data objects are deleted after the review period expires unless the deletion is stopped; and
  deleting fifth data objects assigned to a category indicating that the fifth data objects subject to deletion.

2. The method of claim 1, wherein identifying specific data objects for deletion further comprises identifying one or more deletion indicators for the specific data objects.

3. The method of claim 2, wherein identifying one or more deletion indicators for the specific data objects further comprises identifying a value of the specific data objects to an entity.

4. The method of claim 1, wherein providing the data disposition services comprises:
  receipt of a proposal by an orchestration adaptor;
  evaluation, by the orchestration adapter, of the ability of the orchestration adaptor to satisfy an action specified in the proposal; and
  reporting, by the orchestration adapter, whether the orchestration adaptor can perform the action specified in the proposal.

5. The method of claim 1, further comprising determining whether the data objects include one or more of keywords or phrases specified by a deletion policy associated with the data disposition services.

6. The method of claim 1, further comprising determining if the first or the second metadata associated with the data object include one or more of keywords or phrases specified by the deletion policy associated with the data disposition services.

7. The method of claim 1, further comprising broadcasting that the specific data objects are going to be deleted.

8. The method of claim 1, further comprising changing an access control list on the specific data objects as a precursor to full deletion; and fully deleting the specific data objects when called for by the deletion policy.

9. The method of claim 1, further comprising deleting files included in the data objects that are unrelated to a business of an entity that owns the data objects.

10. The method of claim 1, further comprising identifying the specific data objects for deletion based in part on first metadata collected concerning an infrastructure of the computing system.

11. The method of claim 1, further comprising retaining a copy of the specific data objects in secondary storage or in archive storage prior to deleting the specific storage from primary storage.

12. A method for providing information management in a computing system, the method comprising:
  discovering environment data about an infrastructure of a computing system, the infrastructure including hardware, software, services, applications, and services operating in the computing environment, wherein discovering applications and services includes examining network traffic information to identify the applications and services and discovering environment data includes walking IP addresses to identify servers in the computing system;
  classifying the data objects in the computing system based on information discovered about the data objects, the information including first metadata collected from the data objects using a first adapter and second metadata generated from the data objects using a second adapter, wherein the first metadata already exists with the data objects before being collected and is different from the second metadata and wherein the second metadata is derived from the data objects and at least a portion of the first metadata, wherein deriving the second metadata includes generating at least a portion of the second metadata from content of the data objects;
  applying rules that are selected to manage a scope of the one or more categories that are assigned to each of the data objects during classification, wherein the one or more categories are assigned based on the environment data, the first metadata the second metadata, and results of the rules, wherein the environment data, the first metadata, the second metadata, and results are configured to apprise an owner of the data objects about content of the data objects;
  mapping each of the data objects individually to one or more service level objectives based on the assigned one or more categories of each of the data objects;
  resolving conflicts between conflicting service level objectives in order to prioritize the service level objectives;
  mapping the service level objectives to services that are available to the computing system, wherein the services actually available include data disposition services;
  orchestrating the services including the data disposition services by submitting a proposal to orchestration adapters and selecting selected orchestration adapters from the orchestration adapters that are best suited to provide the services based on responses of the orchestration adapters;
  excluding the data objects subject to the data disposition services based on the assigned categories from receiving other services at the time of performing the data disposition services; and
  performing the data disposition services to the data objects, orchestrated by the orchestration adapter selected for the disposition services, that have been mapped to the data disposition services, wherein providing the data disposition services includes:
    for first data objects that associated with a category indicating that the first data objects contain sensitive information and are stored on an insecure server, moving the first data objects to a secure server and deleting the first data objects from the insecure server;

for second data objects associated with a category indicating that the second data objects require archiving, archiving the second objects and then deleting the second data objects;

for third data objects associated with a category indicating that notification is required, notifying the owner of the third data objects that the third data objects are to be deleted prior to deleting the third data objects, wherein the notification provides the owner with a review period to determine whether the third data objects should be deleted;

for fourth data objects associated with a category indicating that a review period is required, soft-deleting the fourth data objects by setting a bit such that the fourth data objects are hidden from at least some users, wherein the fourth data objects are deleted after the review period expires unless the deletion is stopped; and deleting fifth data objects assigned to a category indicating that the fifth data objects subject to deletion.

13. The method of claim 12, wherein providing the data disposition services includes examining the first and the second metadata for at least one of phrases or words that are included in a list of deletion indicators.

14. The method of claim 13, further comprising applying a deletion policy during classification to determine whether to provide specific data objects with the data disposition services.

15. A method for performing information management for data such that policies of an entity that owns the data are implemented, the method comprising:

collecting, using a first adapter, first metadata concerning data objects stored in a computing system, wherein the first metadata already exists with the data objects prior to collecting the first metadata;

decoding and examining network traffic in the computing system to identify network traffic information that identifies application operating in the network, wherein the network traffic information is included in the first metadata;

deriving, using a second adapter, second metadata concerning the data objects, wherein the second metadata is different from the first metadata and is derived by processing the data objects and at last a portion of the first metadata, wherein at least a portion of the second metadata is derived from content of the data objects;

defining one or more policies that identify treatments for the data objects, wherein one of the policies comprises a deletion policy;

classifying the data objects in the computing system such that categories are assigned to each of the data objects based at least on the first metadata and the second metadata and the one or more policies, wherein the one or more categories assigned to each data object are stored in a repository separate from the data objects, wherein the repository persists state information for each data object that reflects a processing state, wherein the state information facilitates subsequent classifications of the data objects, wherein the state information is configured to apprise an owner of content of the data objects;

mapping each of the data objects individually to one or more service level objectives based on the categories assigned to each of the data objects;

determining services for each of the data objects individually based on the corresponding service level objectives wherein the services include data disposition services, wherein the data disposition services are determined for specific data objects and wherein the one or more categories of the specific data objects reflect why the data objects are identified for the data disposition services;

orchestrating the services including the data disposition service by submitting a proposal to orchestration adapters and selecting selected orchestration adapters from the orchestration adapters that are best suited to provide the services based on response of the orchestration adapters;

excluding the one or more data objects subject to the data disposition service from receiving other services associated with the specific data objects based on the categories assigned to the one or more data objects and until the data disposition service is performed such that the other services are not applied to data objects that do not need the other services; and performing the data disposition services, orchestrated by the orchestration adapter selected for the disposition services, to the data objects that have been mapped to the data disposition services, wherein providing the data disposition services includes:

for first data objects that associated with a category indicating that the first data objects contain sensitive information and are stored on an insecure server, moving the first data objects to a secure server and deleting the first data objects from the insecure server;

for second data objects associated with a category indicating that the second data objects require archiving, archiving the second objects and then deleting the second data objects;

for third data objects associated with a category indicating that notification is required, notifying the owner of the third data objects prior to deleting the third data objects, wherein the notification provides the owner with a review period to determine whether the third data objects should be deleted;

for fourth data objects associated with a category indicating that a review period is required, soft-deleting the fourth data objects by setting a bit such that the fourth data objects are hidden from at least some users, wherein the fourth data objects are deleted after the review period expires unless the deletion is stopped; and deleting fifth data objects assigned to a category indicating that the fifth data objects subject to deletion.

16. The method of claim 15, further comprising one or more of:

associating the one or more policies with the one or more service level data objectives;

mapping the data objects to the services using the service level data objectives when relating the assigned categories with the one or more policies, wherein the specific data objects are mapped to the data disposition services; and initiating a workflow when executing the data disposition services such that the specific data objects are subjected to a period of review prior to deletion from the computing system.

17. The method of claim 12, wherein determining services for each of the data objects individually comprises:

receipt of a proposal by an orchestration adaptor;

evaluation, by the orchestration adapter, of the ability of the orchestration adaptor to satisfy an action specified in the proposal; and reporting, by the orchestration adapter, whether the orchestration adaptor can perform the action specified in the proposal.

18. The method of claim 15, further comprising notifying an owner of reasons why the specific data objects where provided with the data disposition services.

* * * * *